United States Patent [19]

Hildebrandt et al.

[11] 4,173,501
[45] Nov. 6, 1979

[54] STEEL TORSIONAL ELEMENT AND METHOD FOR MAKING

[75] Inventors: Jack A. Hildebrandt, Stevensville; Denver K. Pointer, Buchanan; Herschel H. Stilley, Edwardsburg, all of Mich.

[73] Assignee: Clark Equipment Company, Buchanan, Mich.

[21] Appl. No.: 911,641

[22] Filed: Jun. 1, 1978

[51] Int. Cl.² .............................................. C21D 1/48
[52] U.S. Cl. .................................. 148/16.5; 148/31.5; 148/39
[58] Field of Search ...................... 148/16.5, 31.5, 39, 148/146, 148

[56] References Cited

U.S. PATENT DOCUMENTS

| | | | |
|---|---|---|---|
| 1,043,416 | 11/1912 | Giolitti | 148/31.5 |
| 1,072,661 | 9/1913 | Shore | 148/31.5 |
| 3,141,801 | 7/1964 | Prutton | 148/15.5 |
| 3,357,869 | 12/1967 | Shepeljakovsky | 148/16.5 |
| 3,377,214 | 4/1968 | Woodbridge et al. | 148/16.6 |
| 3,885,996 | 5/1975 | Abe | 148/12.1 |
| 3,891,474 | 6/1975 | Gurange | 148/16.5 |
| 3,946,817 | 3/1976 | Prince | 148/16.5 |
| 4,038,109 | 7/1977 | Pfliegeo et al. | 148/16.5 |

OTHER PUBLICATIONS

"A Dictionary of Metallurgy", A. D. Merriman, MacDonald and Evans Ltd., London 1958, pp. 30, 119 and 269.

Primary Examiner—L. Dewayne Rutledge
Assistant Examiner—John P. Sheehan
Attorney, Agent, or Firm—Mack L. Thomas

[57] ABSTRACT

A steel torsional element includes a first or shaft portion for transmitting torque and a second portion, such as a gear, for transferring torque to another machine element. The entire torsional element is carburized and quenched to a first depth to provide wear-resistance and resistance to surface compressive fatigue in the second portion for the transferring of torque to another machine element. The quenching operation also provides a strong but ductile core for both portions of the steel torsional element. The shaft portion is then induction hardened to a second and greater depth to increase the torsional strength thereof.

7 Claims, 7 Drawing Figures

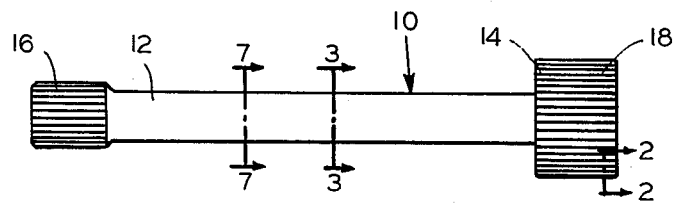
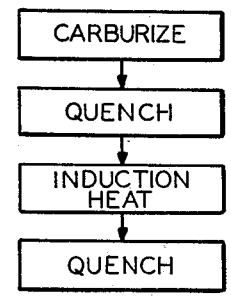
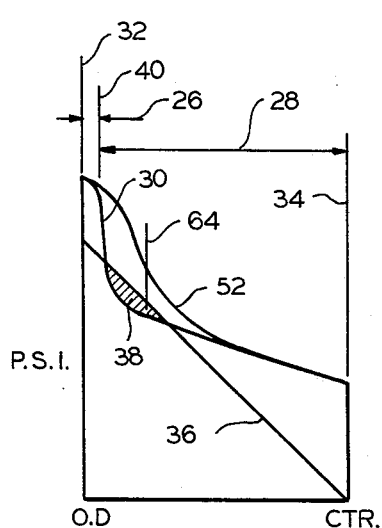
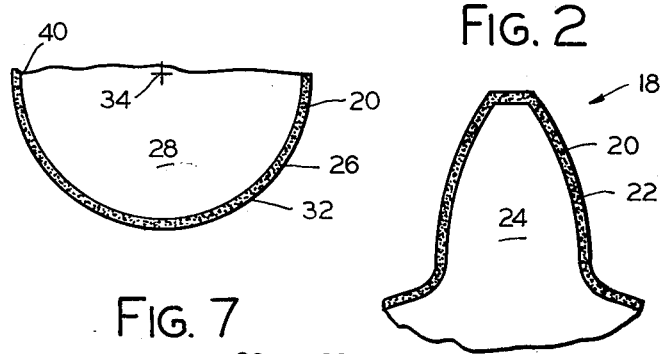
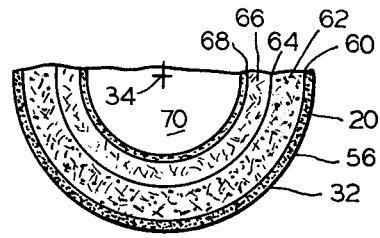
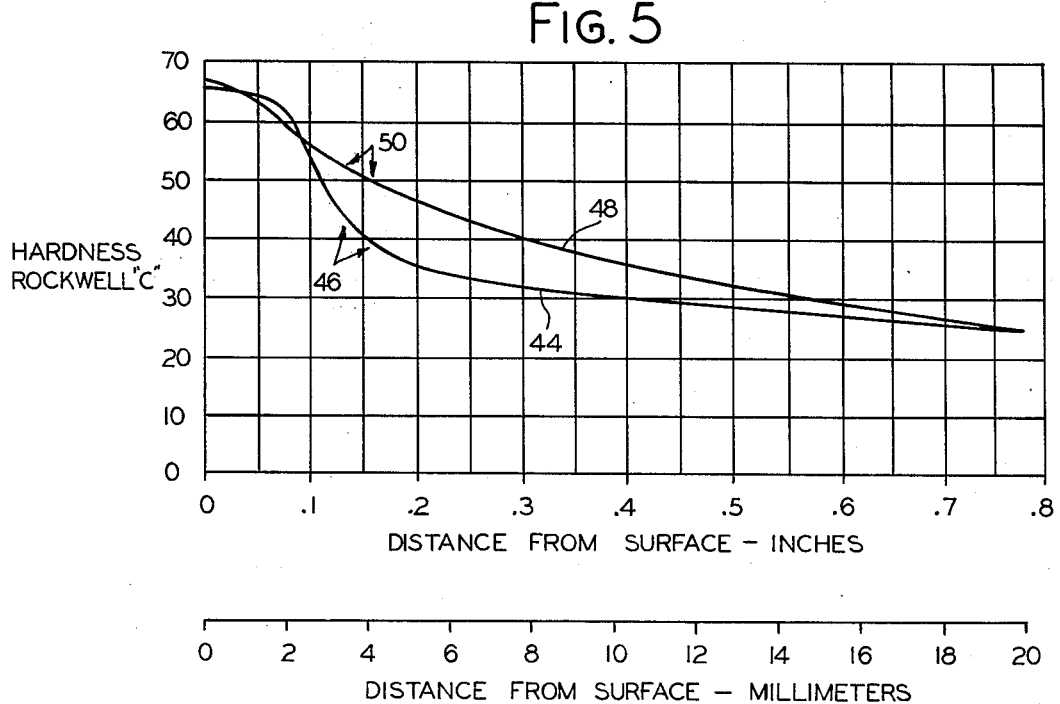

STEEL TORSIONAL ELEMENT AND METHOD FOR MAKING

BACKGROUND OF THE INVENTION

1. Field of the Invention

The present invention relates generally to steel torsional elements and methods for hardening, and more particularly to axles of the type that include an integral sun gear for a planetary final drive reduction, and to a method for hardening the sun gear and shaft portions of the axle to two different depths.

2. Description of the Prior Art

Off-highway mobile construction equipment, such as shovel loaders, rough terrain lift trucks, dozers and cranes, etc., usually use a planetary final drive reduction in each wheel; and the axles may include an integral sun gear that is forged and machined onto one end of the axle.

Because of the relatively small size of the sun gear in relation to the magnitude of transmitted torques, and because the sun gear transmits torque to a plurality of planet gears, the surface of the teeth of the sun gear must be hardened both for wear-resistance and for resistance to surface compressive fatigue. In addition, this type of application includes high shock loads, so that the teeth must have a tough core.

Thus, there is a requirement for a low carbon core that is hardened in excess of Rockwell C-60 for a depth of 0.040, 0.060, or perhaps 0.075 inches, depending upon the loading conditions; and there is a requirement for core ductility that precludes hardnesses above the Rockwell C-40 range.

Carburizing is a preferred method for achieving surface hardness of a sun gear because a low carbon alloy steel, such as SAE 4820-H provides good core strength, and the carburizing process increases the carbon content at the surface to about 0.90 percent carbon, providing a more wear-resistant surface than would be achieved by hardening a medium carbon steel to the same hardness.

It has been common practice to carburize the entire shaft along with the sun gear portion because of a resultant increased torsional strength in the shaft due to increased strength in the hardened case. For example, in a vehicle of the type previously specified, the axle can be up to three inches, or even larger, in diameter; and so the percentage increase in strength due to case hardening to a depth of 0.075 inches, will be small.

In addition, the formation of a martensitic case results in an increased volume of metal in the case, putting the case in compression, putting the core in tension, and resulting in high residual stresses at the interface between the case and the core. These stresses at the case-core interface combine with torsional stresses to cause metal fatigue failures at the case-core interface, thus reducing, or even obviating the strength improvement due to the increased strength of the hardened case.

Fatigue failures of torsionally loaded and case-hardened shafts typically start at the case-core interface, not only because of the aforementioned interface stresses, but also because the torsionally induced shear stresses in a shaft are directly proportional to the distance from the center of the shaft. Thus, the ratio of stress to shear strength is the highest at the radial location where the high shear strength of the case is replaced by the lower shear strength of the core.

Fatigue failures of case-hardened axles, or other torsional machine elements, show one of two types of characteristic failures. In one of the typical types of failures, the fatigued area is circumferentially disposed around the case-core interface and includes radially disposed cracks. The resultant reduction in the ability to linearly distribute stresses between the core and the case then results in complete transverse fracture of the axle.

In the other characteristic fatigue failure, a double crack starts at one point of the case-core interface and proceeds through the hardened case to the surface of the axle in a "V" shape. The failure in the hardened case then proceeds longitudinally along the surface of the axle, leaving a longitudinally disposed and diamond-shaped pattern of failure at the surface, and breaking out diamond-shaped pieces of the hardened case. The diamond-shaped pattern of the resultant case failure is typical; since brittle materials that are in shear fail in an oblique plane by tension.

In the first of the above-related characteristic failures, the failure is primarily a fatigue failure in the portion of the core that is radially proximal to the hardened case; whereas, in the second type of failure, inability of the core to sustain proportional distribution of stresses in the transverse plane, sometimes due to creep stresses rather than by actually exceeding the proportional limit, causes an increase in the stress in the hardened case with resultant fatigue fracturing of the hardened case.

SUMMARY OF THE INVENTION

In accordance with the broader aspects of this invention, there is provided a steel torsional element that includes a first or shaft portion for transmitting torque and a second or torque transferring portion for transferring the torque to another machine element.

In a preferred embodiment, the steel torsional element comprises an axle and the torque-transferring portion thereof comprises an integral sun gear for a planetary drive.

The steel torsional element, or axle, is hardened to two different depths, a shallower depth of hardness being provided for the torque-transferring or gear portion to provide wear-resistance and resistance to surface compressive fatigue while maintaining a softer and tougher core, as for instance, in the gear teeth of the gear portion. The first or shaft portion is hardened to a deeper depth to move the stressed interface radially inward to a zone of lower stress, and to provide an increase in torsional strength by increasing the yield and tensile strengths of a larger portion of the shaft section modulus.

The method includes carburizing the entire steel torsional element to a first depth, oil-quenching the entire torsional element, then progressively heating the length of the shaft portion to a depth greater than the carburized depth, and progressively quenching the progressively heated length of the shaft portion.

It is a first object of the present invention to provide a method for making a steel torsional element having increased torsional fatigue resistance.

It is a second object of the present invention to provide a method for making a steel torsional element having a hardened case and a ductile core to achieve wear-resistance and shock-resistance resistance for a torque-transferring portion, and having a deeper depth of hardness in a torque-transmitting portion to achieve greater resistance to torsional fatigue in a torque-transmitting portion.

It is a third object of the present invention to provide a method for making an axle in which an integral gear is hardened to a first depth and in which the shaft portion thereof is hardened to a greater depth.

It is a fourth object of the present invention to provide a method for hardening a machine element to two different depths.

It is a fifth object of the present invention to provide a steel torsional element having a hardened case and a ductile core to achieve wear-resistance and shock-resistance in a torque-transferring portion, and having a deeper hardness in a torque-transmitting portion to achieve greater torsional strength and greater fatique resistance in a torque-transmitting portion.

These and other advantages and objects of the present invention will be readily apparent when referring to the following detailed description wherein:

BRIEF DESCRIPTION OF THE DRAWINGS

FIG. 1 is a plan view of the present invention wherein the steel torsional element is an axle having an integral gear;

FIG. 2 is a partial and enlarged sectional view of the gear of FIG. 1, taken substantially as shown by view line 2—2 of FIG. 1 and shown in an enlarged scale;

FIG. 3 is an enlarged and partial cross-sectional view of the shaft portion of the torsional element of FIG. 1, taken substantially as shown by cross-section line 3—3, and depicting the case and core structures that are typical of conventional carburizing methods;

FIG. 4 is a graph illustrating the linear proportionality of shear stresses from the outer surface to the center of a torsionally loaded shaft, and representative shear strengths of case-hardened shafts as a function of the distance from the case-hardened surface;

FIG. 5 is a graph depicting hardness vs. depth as achieved by conventional hardening methods in comparison to those achieved by the method of the present invention;

FIG. 6 is a flow diagram of the preferred methods; and

FIG. 7 is an enlarged and partial cross-sectional view of the shaft portion of the torsional elements of FIG. 1, taken substantially as shown by section line 7—7 of FIG. 1, and depicting the microstructures that are achieved by the hardening method of the present invention.

PREFERRED EMBODIMENT

Referring now to FIGS. 1 and 2, a steel mechanical element which comprises a steel torsional element or axle 10 includes an elongated torque-transmitting portion or shaft portion 12, a first torque-transferring portion or gear 14, and a second torque-transferring portion or spline 16. The gear 14 includes a plurality of gear teeth, such as a gear tooth 18.

The torsional element 10 is preferably made from a low carbon alloy steel such as SAE 4820-H and the entire torsional element 10 includes a carburized case or carbon enriched layer 20 that includes approximately 0.90 percent carbon on the surface and a depth that is preferably within the limits of 0.075 to 0.090 inches. This carbon enriched layer 20 is hardened to a value that preferably exceeds Rockwell C-60 to provide a hardened case 22 on the gear teeth 18; but a core 24 of the gear teeth is softer, more ductile, and more shock-resistant, due to the low carbon content of the material.

Preferably, the minimum hardness of the core 24 of the gear teeth 18 approximates Rockwell C-30.

Referring now to FIG. 3, if the shaft portion 12 of the axle 10 were case-hardened as described for the gear teeth 18, which is conventional practice of the prior art, then the shaft portion 12 would have a hardened case 26 and a softer and more ductile core 28.

Referring now to FIGS. 3 and 4, the yield stress in shear, the proportional limit in shear, and the endurance limit in shear would all be of the general shape as depicted by a curve 30 for conventional case-hardening as noted above and as illustrated in FIG. 3. The three aforementioned parameters: yield stress, proportional limit, and endurance limit, would vary in magnitude at various distances from an outside diameter or surface 32 to a center 34 of the shaft portion 12; but the general shape of the curve 30 would be the same for all three parameters.

A line 36 of FIG. 4 depicts the fact that, at stresses below the proportional limit, the shear stresses in a torsionally loaded shaft portion 12 vary linearly from zero at the center to a maximum at the outside diameter.

If the curve 30 is assumed to be the values of the torsional yield strength of the shaft portion 12 at various radial positions, then the core of the shaft portion 12 will yield in the radial location that corresponds to a shaded area 38, destroying linear porportionality in the stress distribution from the center 34 to the outside diameter 32, and resulting in an overstressing and cracking of the hardened case 26. That is, when the ductile core 28 yields, the hardened case 26 will break because the yielded core 28 is no longer taking a linearly proportionate portion of the applied torsional load.

If the curve 30 is assumed to be the proportional limit stresses of the shaft portion 12, then the inelasticity of the core 28 in the shaded area 38 will cause a redistribution of stresses similar to that described in the paragraph above; except that the redistribution of stresses will not be as great and the service life of the case 26 may be extended to several hundred thousand cycles.

Finally, if the curve 30 is assumed to be the endurance limit stresses of the shaft portion 12, then the distribution of the stresses will remain substantially linear as shown by the line 36; but the core 28 will fail by cyclic fatigue in the radial location corresponding to the shaded area 38.

Thus, in all three of the above assumptions, the shaft portion 12 fails because of insufficient strength in the part of the core 28 that is radially proximal to an interface 40 between the core 28 and the hardened case 26.

In addition, the transformation from an austenitic to a martensitic structure in the case 26 during quenching results in an increase in the volume of the case 26. This increase in volume results in a compressive stress in the case, in a tensile stress in the core, and in triaxial stresses in the case-core interface 40. Since it is impossible to torsionally load the shaft portion 12 without one or more of the triaxial stresses being additive, the stresses in the interface function as a metallurgical notch; making the case-core interface the focal point for fatigue cracks.

Referring now to FIG. 5, a curve 44 shows Rockwell C scale hardness readings at various radial distances from the surface 32 for a shaft that is three inches in diameter, that is fabricated from SAE 4820-H, and that is carburized and case-hardened to a depth of approximately 0.090 inches, oil-quenched, and tempered. The rapid drop-off in hardness under the carburized case, that is generally depicted at 46 is typical.

Since there is a proportional relationship between hardness, yield strength, proportional limit, and endurance limit, the rapid drop-off of hardness at 46 also represents a drop-off in yield strengths, proportional limits, and endurance limits similar to that in the curve 30 of FIG. 4. Thus a rapid drop-off of hardness at 46 of FIG. 5 represents a region of failure for a shaft that is highly stressed in torsion.

A curve 48 of FIG. 5 shows typical hardnesses vs. distance from the shaft surface 32 that are achieved by the use of the same steel when hardened to a deeper depth by the method of the present invention. The improved hardnesses in the region generally depicted at 50 results in an increase in yield strengths, proportional limits, and endurance limits, as indicated by a curve 52 of FIG. 4; and so these improved hardnesses and strengths obviate the overstressing of the portion of the core that is depicted by the area 38, with a resultant increase in service life.

PREFERRED METHOD

Referring now to FIG. 6, the preferred heat treatment of axles made from SAE 4820-H steel includes carburizing at 1675°–1725° F. to produce a carbon-enriched case that is 0.075 to 0.090 inches thick, cooling to 1500°–1550° F., oil-quenching to produce a surface hardness of Rockwell C-60 on the teeth 18 and to produce a ductile but strengthened core 24 and 28, progressively heating the length of the shaft portion 12 to a depth of 0.650 to 0.750 inches by encircling the shaft portion 12 with an induction coil and by moving the induction coil longitudinally at a rate of approximately eight inches per minute, and progressively quenching the shaft portion 12 with a quench medium, as for example, by spraying a mixture of water and a cooling retardent such as a polyvinyl alcohol (preferably in the range of 3–5%), onto the shaft portion 12 proximal to the induction coil to produce a surface hardness of Rockwell C-60 and to produce a hardness in excess of Rockwell C-40 at a depth of 0.200 inches below the surface of the shaft portion 12. Typically, the effective depth of induction hardening, which is the depth at which the hardness drops to Rockwell C-40, varies from 0.350 to 0.460 inches.

Referring now to FIG. 7, typical resultant metallurgical structures as achieved by the preferred method are as follows: the carbon-enriched layer 20 that is produced by the carburizing process and that includes a carbon content at a surface 32 of approximately 0.90 percent and a carbon content at a radially inward boundary 60 of approximately 0.20 percent. The carbon-enriched layer 20 is hardened to provide an outer case 56 in which the microstructure consists of a lightly tempered martensite.

A layer 62 which is immediately below the outer case 56 consists of a mixture of self-tempered martensite and bainite with the layer 62 becoming increasingly bainitic at portions of the layer 62 that lie the farthest inward.

Both the carbon-enriched layer 20 and the layer 62 were fully austenitized by induction heating; so the induction hardening of the radially outward part of the shaft portion 12 includes both the layer 20 and the layer 62; and an interface 64, between the induction hardened radially outward part and the softer core, is located at the boundary between the layer 62 and a layer 66.

In the layer 66, the induction heating has resulted in a refinement of the grain size; and the microstructure is a mixture of bainite and ferrite. In a layer 68 the structure was tempered by the induction heating cycle resulting in spheroidizing of cementite; and in a core 70 the structure is bainitic and was unaffected by the induction heating step.

The aforementioned improved properties are the result of the stated steps of the method as follows: carburizing provides good hardenability and wear-resistance, the oil-quench provides a ductile core 24 in the gear teeth 18 and prevents both cracking and excessive distortion as opposed to a more severe quench; the induction heating is restricted to the shaft portion 12 so that the gear teeth 18 are not affected, and is limited to the radially outward part of the shaft portion 12 so that the heat-treated core 70 remains in its original heat-treated condition; and the induction hardened radially outward part, which includes both the carbon-enriched layer 20 and the layer 62 are hardened by a quenching rate that includes both the spraying of a water-based solution onto the outer surface 32 and the relatively cool core 70.

In summary, the method of the present invention provides two different depths of case-hardening. A first or shallower depth of hardening is achieved by carburizing and quenching with oil, providing wear-resistance and resistance to surface compressive fatigue while retaining a ductile and shock resistance core. This shallower hardening is used for torque-transferring portions such as splines and gears. The method also provides hardening to a second or deeper depth in areas that are critically stressed in torsion; and the deeper depth of hardening improves the fatigue life in two ways: first by increasing the core strength proximal to the carbon-enriched or carburized case as shown by the curve 48 of FIG. 5 and by the curve 52 of FIG. 4; and second, by moving the interface, between the hardened outer portion and the softer core, radially inward, from a case-core interface 40 to an interface 64 of FIG. 4, where applied torsional stresses are lower, thereby reducing the total combined stress which includes the combined stresses of torsional shear stress and interface stress.

The overall result is an increase in the service life of the axle 10, an increase in the reliability factor thereof, and a decrease in warranty costs pertaining thereto.

While only a single embodiment of the present invention and a single method have been described in detail, it will be understood that the detailed descriptions are intended to be illustrative only and that various modifications and changes may be made without departing from the spirit and scope of the present invention. Therefore the limits of the present invention should be determined from the attached claims.

what is claimed is:

1. A method for increasing the torsional strength of a steel torsional element, which method comprises the following steps in the sequence set forth:
    (a) carburizing the steel torsional element at austenitizing temperatures to a first depth, whereby a carbon enriched case is produced to the first depth;
    (b) quenching the torsional element from said austenitizing temperatures with an oil-like quenching medium, whereby a first hardened case to the first depth is produced, and whereby a heat-treat strengthened core is produced;
    (c) successively heating longitudinal portions of the torsional element to austenitizing temperatures to a second and greater depth without appreciably affecting the heat-treat strengthed core below the greater depth; and (d) quenching the successively heated longitudinal portions of the torsional element from said austenitizing temperatures with both a water-base quenching medium and the heat-treat strengthened core below the greater depth, whereby the hardness of the first hardened case is a function of both the carbon enriched case and the second recited quenching step, and whereby hardness is produced between the first and second depths of the successively heated longitudinal portions that is both a function of the carbon content of the steel prior to the carburizing step and the second recited quenching step.

2. A method for producing a steel element having two different depths of hardening and having a heat-treat strengthened core, which method comprises the following steps in the sequence set forth:

(a) carburizing the steel element at austenitizing temperatures to the shallower of the two depths, whereby a carbon enriched case is produced to the shallower depth;

(b) quenching the steel element from said austenitizing temperatures with an oil-like quenching medium, whereby both a hardened case to the shallower depth and a heat-treat strengthened core are produced;

(c) induction heating selected portions of the steel element to austenitizing temperatures to the deeper of the two depths without appreciably affecting the heat-treat strengthened core below the deeper depth; and (d) quenching the selectively heated portions of the steel element from said austenitizing temperatures with both a water-base quenching medium and the heat-treat strengthened core below the deeper depth, whereby the selectively heated and quenched portions have a hardness to the shallower of the two depths that is a function of both of the carbon enriched case and the second recited quenching step and have a hardness between the shallower and deeper depths that is substantially a function of both the carbon content of steel before the carburizing process and the second recited quenching step.

3. A method for producing a steel torsional element having a torque-transferring portion that includes both a first depth of hardening and a first heat-treat strengthened core and having an elongated torque-transmitting portion that includes both a second and greater depth of hardening and a second heat-treat strengthened core, which method comprises the following steps in the sequence set forth:

(a) carburizing the torsional element at austenitizing temperatures to a first depth, whereby a carbon enriched case is provided to the first depth and whereby a first core inside the first depth remains substantially unenriched by the carburizing step;

(b) quenching the torsional element from said austenitizing temperatures with an oil-like quenching medium, whereby both a hardened case to the first depth and a heat-treat strengthened first core are produced;

(c) progressively heating the torque-transmitting portion to austenitizing temperatures to the second and deeper depth without appreciably affecting the heat-treat strengthened core below the second depth by encircling the torque-transmitting portion with an induction coil and by providing relative longitudinal movement between the induction coil and the torque-transmitting portion; and (d) quenching the progressively heated portion from said austenitizing temperatures with both a water-base quenching medium proximal to and progressively subsequent to the progressive heating step and the heat-treat strengthened core below the second depth, whereby the progressively heated and progressively quenched portion has a hardness to the first depth that is a function of both the carbon enriched case and the second recited quenching step and has a hardness between the first and second depths that is substantially a function of both the carbon content of the steel prior to the carburizing step and the second recited quenching step.

4. A method as claimed in claim 3 in which the second quenching step comprises spraying said quenching medium onto said torque-transmitting portion.

5. A method of hardening an axle that includes a shaft portion and an integral gear and that is made of steel having less than 0.35 percent carbon, which method comprises the following steps in the sequence set forth:

(a) carburizing the axle and gear at a temperature between 1600° and 1800° F. to produce a case of increased carbon content to a first depth and whereby a first core inside the first depth remains substantially unenriched by the carburizing step;

(b) quenching the axle and integral gear in oil from 1475°–1600° F., whereby both a hardened case to the first depth and a heat-treat strengthened first core are produced;

(c) progressively heating the shaft portion to austenitizing temperatures to a second and deeper depth without appreciably affecting the heat-treat strengthened core below the second depth by encircling the shaft portion with an induction coil; and (d) quenching the progressively heated shaft portion by both spraying a quenching medium that comprises a mixture of water and a cooling retardant onto the shaft portion proximal to the induction coil and the heat-treat strengthened core below the second depth.

6. A steel torsional element which comprises a shaft portion, and a torque-transferring portion that includes a plurality of teeth;

said torque-transferring portion comprises a core having less than 0.35 percent carbon and having a minimum core hardness in said teeth of less than Rockwell C-40, and an enriched carbon case having a surface hardness of said case in excess of Rockwell C-55; and said shaft portion comprises a core having less than 0.35 percent carbon and having a minimum core hardness of less than Rockwell C-35, an enriched carbon case having a surface hardness in excess of Rockwell C-55, and a hardness greater than Rockwell C-40 at a depth of 0.200 inches.

7. A steel torsional element as claimed in claim 6 in which said steel torsional element comprises an axle, and said torque-transmitting portion comprises a gear.

* * * * *